(12) United States Patent
Jorden et al.

(10) Patent No.: US 7,778,983 B2
(45) Date of Patent: Aug. 17, 2010

(54) APPLICATION MIGRATION FILE SCANNING AND CONVERSION

(75) Inventors: Michael Philip Jorden, Redmond, WA (US); Tristan Michael Root, Bothell, WA (US); Eric Fisk, Seattle, WA (US); Joseph Anthony East, Redmond, WA (US); Vladimir Tankovich, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 317 days.

(21) Appl. No.: 11/714,690

(22) Filed: Mar. 6, 2007

(65) Prior Publication Data

US 2008/0222216 A1 Sep. 11, 2008

(51) Int. Cl.
*G06F 17/00* (2006.01)
(52) U.S. Cl. .................. 707/695; 717/168; 717/169; 717/170; 717/171; 717/172
(58) Field of Classification Search .................. None
See application file for complete search history.

(56) References Cited

U.S. PATENT DOCUMENTS

| | | | |
|---|---|---|---|
| 6,820,094 | B1 | 11/2004 | Ferguson et al. |
| 6,993,539 | B2 | 1/2006 | Federwisch et al. |
| 7,099,902 | B2 | 8/2006 | Tran et al. |
| 2002/0069280 | A1 | 6/2002 | Bolik et al. |
| 2003/0188036 | A1 | 10/2003 | Chen et al. |
| 2006/0101058 | A1 | 5/2006 | Chidlovskii |
| 2006/0236315 | A1 | 10/2006 | Bracha |
| 2006/0288344 | A1 * | 12/2006 | Brodersen et al. ........... 717/168 |
| 2006/0294039 | A1 | 12/2006 | Mekenkamp et al. |

OTHER PUBLICATIONS

"Introduction to OMPM," Date: Jan. 15, 2007; pp. 1-6; http://technet2.microsoft.com/Office/en-us/library/d0373697-31f5-4fc5-8dd1-1b9d7f35842f1033.mspx?mfr=true.

Converter Technology, "Pyxis Enterprise Migration Toolkit™," Date: Jan. 15, 2007; pp. 1-2; http://www.convertertechnology.com/products.cfm.

NTP Software™, "Deep Scan™," Date: Jan. 15, 2007; 1 Page; http://www.ntpsoftware.com/Technology/.

(Continued)

*Primary Examiner*—Apu M Mofiz
*Assistant Examiner*—Anteneh Girma
(74) *Attorney, Agent, or Firm*—Merchant & Gould P.C.

(57) ABSTRACT

An application migration planning manager is provided for scanning and reporting compatibility information of stored application files, followed by conversion of selected files from a first application version format to a target application version format. A scanning module scans selected files to determine whether the scanned files are formatted according to application versions that may be incompatible with target application versions. A reporting module reports the compatibility data for the scanned files. If scanned files include multiple versions of a given document or data, the scanned files may be passed to a version extraction module for stripping the files of all but a single version of the given document or data. Each stripped version may be saved as a separate additional file. The version-stripped files and the saved additional files then may be reported back to the reporting module for further processing. Scanned files may be automatically or manually sent to a file converter module where they may be converted to a target application version.

14 Claims, 3 Drawing Sheets

OTHER PUBLICATIONS

ON Technology-Press Release, "ON Technology and Shavlik Technologies, LLC Join Forces to Create Industry's First Enterprise-Class Solution for Comprehensive Patch Management & Remediation," Date: Jan. 15, 2007; pp. 1-4; http://www.symantec.com/press/on/on102103.html.

Microsoft Press Pass, "Q&A: Microsoft Office Access 2003 Conversion Toolkit Will Significantly Streamline Database Conversion and Ease Deployment of Microsoft Office 2003 for Customers," pp. 1-3, May 24, 2004, https://www.microsoft.com/presspass/press/2004/may04/05-24accessconversionfaq.mspx.

* cited by examiner

US 7,778,983 B2

APPLICATION MIGRATION FILE SCANNING AND CONVERSION

BACKGROUND

Since the advent of computer software, compatibility problems between application versions have been a source of frustration for application developers, administrators and users alike. Sometimes version changes cause only minor problems, for example, when a functionality of a later version of a given software application is applied to a document that is not available on an older version of the application on which the document is launched for editing. Other version changes, however, cause major problems, for example, when a later version of a given application uses a file creation/save format that cannot be read by older versions of the software application. In addition, in many organizations, computing systems administrators have difficulty determining the numbers and locations of files saved with varying versions of available software applications which makes the task of addressing compatibility issues more difficult. It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing an application migration planning manager for automated scanning and compatibility information reporting of stored application files, followed by automated conversion of selected files from a first application version format to a second application version format.

According to embodiments, one or more selected files or all files contained in a given file storage location may be scanned by a scanning module to determine if the scanned file or files are formatted according to one or more application versions that may be incompatible with a later or target application version. Data on each scanned file is stored to a database. A reporting module extracts the data on each scanned file and reports the data to a user or administrator as to any compatibility issues determined for the scanned files as compared to one or more target software applications with which the scanned files subsequently may be launched and edited.

If scanned files include multiple versions of a given document or data, the scanned files may be passed to a version extraction module for stripping the files of all but a single version of the given document or data. Each stripped version may be saved as a separate additional file. The version-stripped files and the saved additional files then may be reported back to the reporting module for further processing.

From the reporting module, scanned files then may be automatically or manually sent to a file converter module where they may be converted to a target application version. Converted files then may be stored for subsequent use with the target application version. Advantageously, the file administrator or other user may use the application migration planning manager of the present invention to determine the numbers and locations of files formatted according to different application versions, and the automated file conversion may be applied to files to enable the converted files for use on a target application version.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
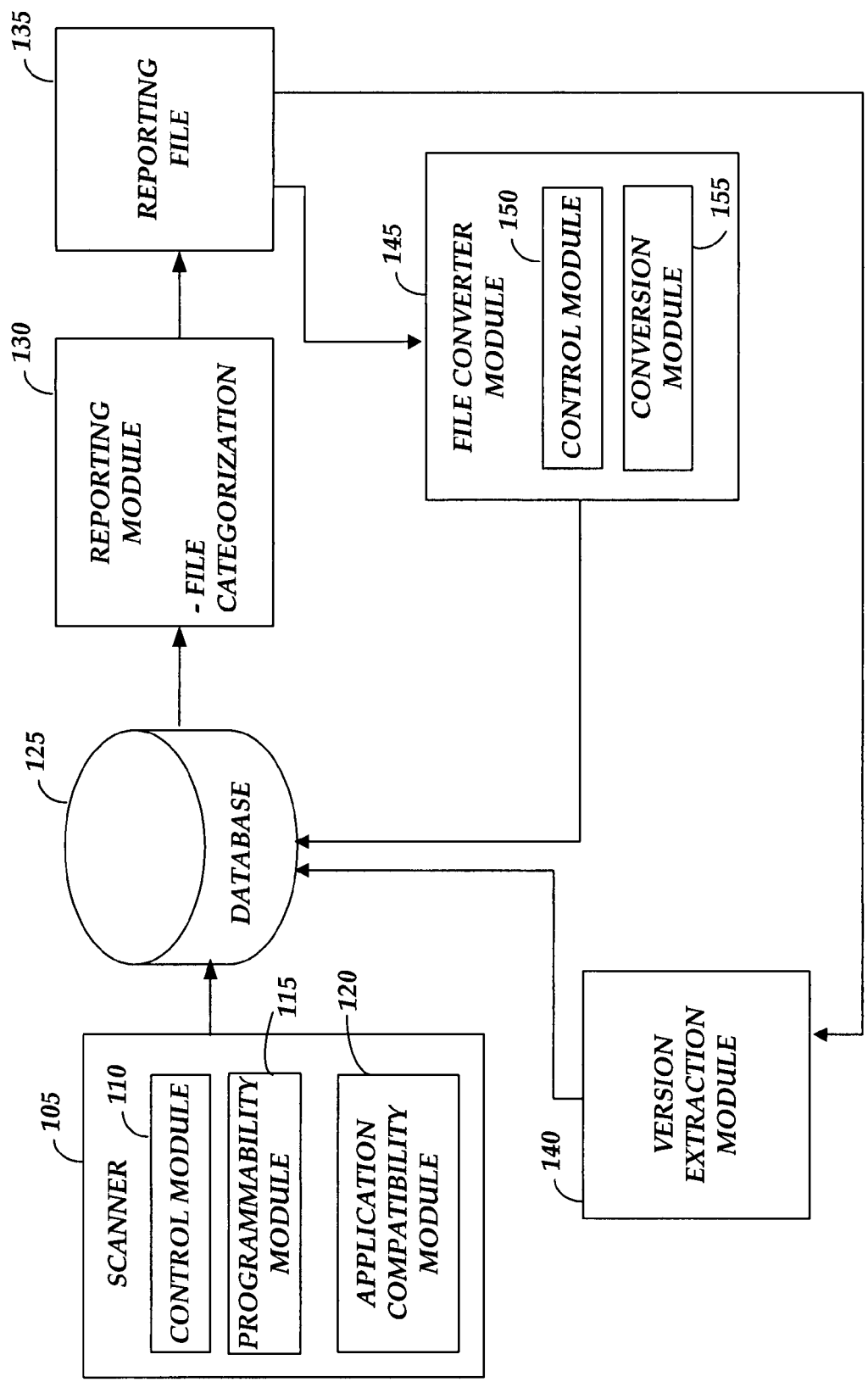
FIG. 1 is a simplified block diagram illustrating a system architecture of an application migration planning manager.

As briefly described above, embodiments of the present invention are directed to an application migration planning manager that allows a user or administrator to scan one or more selected files or all files stored at a given file storage location to determine the numbers and locations of files formatted according to a given application version followed by an automated version stripping and/or file conversion of selected files from a first application version to a second or target application version. The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

FIG. 1 is a simplified block diagram illustrating a system architecture of an application migration planning manager. The application migration planning manager 100 includes a scanner module 105, a database 125, a reporting module 130, a version extraction module 140, and a file converter module 145. According to embodiments of the present invention, the scanner module 105 is responsible for scanning one or more selected files or all files contained at a given file storage location for determining the application versions and other file data for the scanned files and for determining any programmability or compatibility issues with the scanned files versus a target or desired application version. For example, if a system administrator for a given organization upgrades the word processing applications maintained on the organization's computers to version 3.0, the system administrator may desire to know the numbers and locations of documents created by versions 1.0 and 2.0 of the word processing application so that the administrator may determine what compatibility issues he/she must deal with and the numbers of files that must be addressed. For example, all documents prepared with version 1.0 of the word processing application may require complete file conversion to the new version 3.0 file format in order to be used by the new word processing applications installed on the administrator's computers. On the other hand, those files prepared with version 2.0 of the word processing application may not require a complete file conversion because version 2.0 of the word processing application may store files according to the same file format as the newly installed version 3.0, but some functionality differences may exist between version 2.0 and version 3.0.

According to embodiments, the application migration planning manager 100 described herein is equally useful for scanning, reporting and converting files for application compatibility in both a forward and backward direction. For example, if an organization operates an older version of one or more software applications, but the organization receives files created by later or newer versions of the one or more applications, the application migration planning manager 100 of the present invention may be used to scan the later version files for determining whether corrective action, including possible file conversion, is necessary to allow those files to be operated on the organization's older or legacy versions of the applicable software applications.

Referring still to FIG. 1, the scanner module 105 includes a control module 110, a programmability module 115 and one or more application compatibility modules 120. The control module 110 is a software application module operative to allow the scanner module 105 to navigate a file storage location to find one or more selected files or to navigate an entire file storage location for all files associated with a given software application. For example, the control module 110 is operative to navigate through all files contained in a given file storage location for finding all documents created and stored according to one or more versions of a given word processing application. The control module 110 is also operative to exclude individual folder paths from a given scan, if desired. According to embodiments, the control module 110 is operative to navigate through one or more file storage locations on a given local computing device or on a remote computing device accessed via a distributed computing network.

In addition, the control module 110 is operative to define the file formats that are to be scanned and for writing resulting data on scanned files to a database 125, described below. For example, if it is known that a number of word processing documents are stored according to a first file format and that a second number of word processing documents are stored according to a second file format, but that a currently in-use word processing application stores files according to a third file format, the control module 110 may be programmed to scan selected file storage locations for word processing documents saved according to the first and second file formats for letting an administrator know the numbers and locations of those documents and for allowing for conversion of those documents to the currently in-use application version.

The programmability module 115 of the scanner module 105 is operative to scan files for the presence of various programming codes or methods, for example, Visual Basic for Applications (VBA), as well as for the presence of signatures or other properties in such files, that may present compatibility problems for a different or later version of a given software application as compared to earlier or different versions of the software application responsible for creating and storing the scanned files.

The application compatibility module 120 is illustrative of one or more software application modules operative to determine whether a given electronic file is of a different version than a target software application, and the compatibility module 120 is further operative to return data on a given electronic file including version identification, date created, date modified, author, etc. The application compatibility module 120 may scan files created and stored according to different software applications. For example, one application compatibility module 120 may be a word processing application compatibility module, a second application compatibility module 120 may be associated with a spreadsheet application, a third application compatibility module 120 may be associated with a database application, a fourth application compatibility module 120 may be associated with a slide presentation application module, and so on. According to embodiments, each application compatibility module 120 is a compiled module operative to determine an application version and other properties associated with a given document or file and for returning this information to the control module 110. An application programming interface is utilized between the control module 110 and each of the application compatibility modules 120 for passing files to the application compatibility modules 120 and for returning data from the application compatibility modules 120 to the control module 110.

If the control module 110 is directed to scan for all slide presentation application files created and stored according to a given application version, the control module may pass a scanning request and file storage location path to the application compatibility module 120 responsible for scanning slide presentation application files and for returning to the control module 110 version information as well as other properties, for example, date created, date modified, document author, and the like to the control module 110 for storage in the database 125. Similarly, if the control module 110 is directed to scan for one or more word processing files created and stored according to different versions of a given word processing application, the control module 110 may pass the scanning request and file storage path to the application compatibility module 120 responsible for word processing application files. As should be appreciated, if the control module 110 is directed to scan all files contained in a given file storage location, then all word processing files found at the storage location may be scanned by a word processing application compatibility module 120, all spreadsheet files found at the storage location may be scanned by a spreadsheet application compatibility module 120, all slide presentation application files found at the storage location may be scanned by a slide presentation compatibility module 120, and so on.

Use of the application compatibility modules 120 allows for extensibility of the application migration planning manager 100 because developers of various software applications may develop an application compatibility module 120 for their respective applications for inclusion in the scanner module 105 to allow the scanner module 105 to scan files created and stored by their respective applications.

According to embodiments, the scanner module 105 may be utilized for a shallow scan of a given file storage location, or the scanner module 105 may be utilized for a deep scan of a given file storage location. If a given user or administrator desires only to know the numbers and locations of files stored according to one or more application versions, the scanner 105 may be operative to run a shallow scan of a given file storage location path and to return information on the numbers and locations of documents or files stored according to one or more given application versions. The shallow scan mode of the scanner module 105 is useful to administrators who desire to only know the numbers and locations of certain types of files. For example, an administrator may not desire to engage in file conversion of files created and stored according to certain versions of a given application if the numbers of those files are minimal and do not justify a conversion effort. On the other hand, if the administrator learns that a very large number of files are stored according to an application version that will be required for use with a later application version, then the administrator may determine that those files should be converted to the later application version. If the administrator desires a deep scanning of all files located in one or more file storage locations, then the aforementioned process of passing each of the files to an associated application compatibility module 120 may be performed for returning application specific information including versioning and other application specific properties about each file contained in a file storage location for subsequent file version management, including conversion of one or more files to a different application version.

According to embodiments, data obtained from the scanner module 105 on each scanned file, as described above, is written to a log file by the control module 110 and is stored to a database 125. The log file may be formatted according to a variety of acceptable file formats, for example, the Extensible Markup Language (XML) format. In addition, the database 125 may be enabled by one of a variety of suitable database applications, for example, a SQL Server manufactured by MICROSOFT CORPORATION of Redmond, Wash.

Referring still to FIG. 1, the reporting module 130 is a software application module operative to report to a user or administrator the results of a scanned file storage location and to allow the user or administrator to take actions on one or more scanned files. According to an embodiment of the present invention, the reporting module 130 either automatically or upon the command of a user or administrator interrogates the database 125 for data on one or more scanned files. The reporting module 130 may present a graphical user interface that lists compatibility data on scanned files to allow the user or administrator to know whether further actions need to be taken on any of the scanned files. For example, data presented by the reporting module 130 may include an identification of the software application responsible for creation and storage of a given file, for example, a word processing application, a spreadsheet application, a slide presentation application, a database application, etc. In addition, a version number for the applicable software applications and other properties associated with a given file, for example, date created, date modified, author, contributors, and the like may be presented for scanned files. As should be appreciated, any properties associated with a given file scanned by the scanner module 105 may be presented via the reporting module 130.

In addition, the reporting module 130 may be utilized for reviewing the scanning results of particular file storage locations, or for documents created and stored by a particular application. For example, a user or administrator may utilize the reporting module 130 for reviewing the scanning results of all documents, regardless of document type, scanned from a particular file folder at a particular location. On the other hand, the user or administrator may utilize the reporting module 130 to review the results of all documents of a particular type, for example, all word processing application documents or all spreadsheet application documents, located at a particular storage location or at numerous storage locations contained on a given computing device. For example, if a user or administrator has deployed a version 3.0 of a given spreadsheet application onto all computing devices under the administrator's charge, the administrator may wish to determine the numbers and locations of spreadsheet application documents in the administrator's organization that were created or saved by either version 1.0 or version 2.0 of the spreadsheet application so that the administrator will know the magnitude and types of any compatibility issues the administrator is facing owing to the deployment of the version 3.0 spreadsheet application. As should be appreciated, the scanner module 105 may be programmed to periodically scan various locations for selected file types so that the administrator may from time to time check the results of scanned file storage locations for desired file types.

As mentioned above, the application migration planning manager 100 may be utilized for shallow file scanning or for deep file scanning. For a shallow file scanning, the reporting module 130 may be utilized for simply displaying a listing of the numbers and locations of files of a given application version or for the numbers and locations of all files of a given application type, for example, word processing application files, or for all files contained in a given file storage location regardless of application type. Thus, using the reporting module 130, the user or administrator of the system 100 may receive a quick reporting of data on one or more selected files, as described herein.

On the other hand, the manager 100 may be utilized for a deep scanning of selected files to allow the user or administrator to perform actions on selected files. According to this embodiment, the reporting module 130 may present to the user or administrator a categorization for each scanned file to allow the user or administrator to know whether actions are needed on various files to allow those files to operate on a current version of a given software application deployed by the user or administrator. For example, if it is known that files or documents contain multiple edited versions of the files or documents that are not compatible with a currently in-use software application, data may be applied to such files by the scanner module 105 and subsequently stored in the database 125 to cause such files to be reported via the reporting module 130 as requiring corrective action before such files may be utilized by the currently in-use software application. For example, if a given word processing application file scanned by the scanner module 105 includes multiple versions of a given document, this information may be determined by the scanner module 105 and may be reported via the reporting module 130. In such cases the multiple versions must be saved as separate additional files before file conversion to a different application version may be performed. Thus, a first category of files may include documents or files requiring significant corrective action before they may be utilized by the currently in-use or target software application version may be categorized in a manner that notifies the user or administrator that corrective action must be taken.

A second category of files, while of a different version of the target software application, may not require extensive corrective action before they may be utilized with the target version of the software application. For example, a previous version of a given software application may create and store files according to a same file format as a later and currently in-use version of the software application, but certain functionalities applicable to the previous version of the software application may no longer be applicable to the target version of the software application. In such a case, because the files are created and stored using the same file format, significant corrective action may not be required to allow the files to be used on the target version of the software application, but the user or administrator may still need to know that certain functionalities or certain attributes of the files created with the previous version of the software application may not be available with the target software application. A third category of files scanned by the scanner module 105 and reported via the reporting module 130 may include files having no compatibility issues. For example, files created by a previous version of a given software application may be fully compatible with a later or currently in-use version of the software application.

According to an embodiment, for the sake of convenience and usability, scanned files reported by the reporting manager 130 may be color coded or otherwise identified according to the categories described above. For example, all files categorized according to the first category, requiring significant corrective action, may be color coded red. Files associated with the second category, described above, may be color coded yellow, and files of the third category, requiring no corrective action, may be color coded green. As should be appreciated, other methods of denoting these categorizations may be readily used, for example, numbering, differing icon presentations associated with each category, and the like.

As described above, some documents or files scanned by the scanner module 105 and reported by the reporting module 130 may require corrective action before they may be utilized by a different version of a given software application. For example, some files may include multiple edited versions of the same document or data. For example, in previous versions of some software applications, different edited "versions" of the same document may be saved in one document, thus allowing the user to review prior changes in the document. In such cases, these files may be categorized as requiring significant corrective action to notify the user or administrator via the reporting module 130 that multiple edited versions of a document must be stripped from a given file and saved as separate additional files before the starting file and additional files may be converted to the different file format associated with the currently in-use software application.

Referring still to FIG. 1, if it is determined that one or more of such files must have file version correction, the files may be designated for version stripping. According to embodiments, data representing the files is passed to a reporting file 135 and is then passed to a version extraction module 140. At the version extraction module 140, the multiple edited versions of documents or data contained in identified files are extracted or stripped from the selected files and are saved as separate additional files. That is, each of the multiple edited versions is saved as a separate file that subsequently may be processed by the file converter module 145 discussed below. As should be appreciated, the selected files may be stored in their respective file storage locations throughout the process described herein. That is, data associated with the respective files may be passed between the modules of the system 100, and as action is taken on the respective files, that action may be passed to or taken on the files at their present storage location. Alternatively, the files may be passed between the modules of the system 100 where action is taken on the files, followed by storage of the files back to their respective storage locations.

After multiple edited versions of a given document or data have been extracted and saved as separate additional files by the version extraction module, data representing the files are stored back to the database 125. Now, the reporting module 130 may once again extract data for these files from the database 125 to report the results of the version extraction process to the user or administrator. According to embodiments, now that the multiple edited file versions have been stripped from the selected files and have been saved as separate additional files, the selected files may be reported via the reporting module 130 according to a lower compatibility categorization not requiring such version stripping action.

Referring back to the reporting module 130, files or documents requiring file conversion to a different software application version for which file conversion is applicable may be passed via the reporting module to the file converter module 145. That is, any files or documents categorized by the second or third categorizations may be sent to the file converter module 145 for conversion to a different software application version, as described below. For example, files that were previously categorized as bearing additional edited versions, but that have been passed through the version extraction module 140 and returned back to the reporting module 130 in a lower compatibility characterization, may now be passed to the file converter module 145 for conversion to a different application version. Advantageously, the user or administrator of the reporting module 130 has control over which, if any, files are passed to the version extraction module 140, or ultimately, to the file converter module 145 for conversion processing. For example, if an administrator desires to convert all documents or files created by versions 1.0 and 2.0 of a word processing application to version 3.0 of the word processing application, the selected files may be passed to the file converter module 145 for conversion to the later version of the software application. On the other hand, if the administrator realizes from the reporting at the reporting module 130 that only a small number of version 1.0 documents or files have been created and stored, the administrator may only pass those documents bearing version 2.0 of the example word processing application to the file converter 145 for file conversion.

According to an alternative embodiment, an automated system may be deployed wherein files requiring version extraction are automatically passed to the version extraction module 140 followed by file conversion by the file converter 145, as described below. Likewise, files not requiring version extraction, but requiring file conversion may be automatically passed to the file converter 145. Such an automated process may be run by the application migration planning manager 100 by the user or administrator for taking corrective action on all files or documents of different software application types when new or different versions of software applications are deployed.

When one or more files are directed to the file converter module for file conversion, data representing the files to be converted is written to the reporting file 135 in a suitable format, for example, the Extensible Markup Language (XML) format. Data representing each file to be converted is passed in a reporting file 135 to the file converter module 145. The file converter 145 may then follow a path to the files to be converted to retrieve the files for conversion, as described below.

Referring still to FIG. 1, the file converter module 145 is a software application module operative to convert a received application document from one version or one format to a second version or second format. The file converter module 145 comprises a control module 150 and a conversion module 155. The control module 150 is a software application module operative for controlling the activities of the file converter module. The control module 150 receives data in the reporting file 135 from the reporting module 130 and directs the activities of the file converter module for converting a given file or document as required. According to one embodiment, the control module 150 follows a path to a given file to be converted and retrieves the file for conversion by one or more conversion modules 155.

The conversion module 155 is a software application module operative to convert a given file or document from one version to a second version or from one format to a second format. For example, if a file is reported at the reporting module 130 that was created and stored by a word processing application using a binary format, and a currently in-use version of the word processing application creates and stores documents according to an XML format, the file may be passed to a word processing conversion module 155 by the control module 150 for conversion to XML format to allow the file to be used with the target software application. Once files passed to the file converter 145 have been converted as directed by the individual conversion modules 155, data representing the converted files is written back to the database 125 for subsequent reporting via the reporting module 130.

The conversion module 155 may be representative of a plurality of different conversion modules associated with different software applications. For example, a first conversion module 155 may be a software application module operative for converting a word processing application document from one version or format to a second version or format. Similarly, the conversion module 155 may be representative of a spreadsheet application module operative to convert a spreadsheet application document from one version or format to a second version or format. If two files are sent to the file converter module, for example, a word processing application file and a spreadsheet application file, the control module 150 will direct the word processing application file to the word processing application conversion module, and the spreadsheet application file will be passed to the spreadsheet application conversion module.

The conversion module 155 provides for extensibility of the application migration planning manager 100 because additional conversion modules 155 may be added to the system 100 to allow for file conversion of different types of application documents or files. For example, if a developer of a new version of a given software application not previously requiring any type of file conversion develops a new version of the software application, a conversion module 155 may be developed for the new version of the software application and may be added to the file converter module 145 for converting files created and stored according to an older or different version of the software application to a format or version required by the newer version of the software application. It should be appreciated that conversion modules 155 for converting files from one file format to another file format to allow the files to be used by a later or different version of a given software application are well known to those skilled in the art and need not be discussed in detail herein. It should also be appreciated that the examples provided herein of file conversions of any particular file from one format to another are for purposes of illustration only and are not limiting of the invention as claimed herein.

Figure 2:
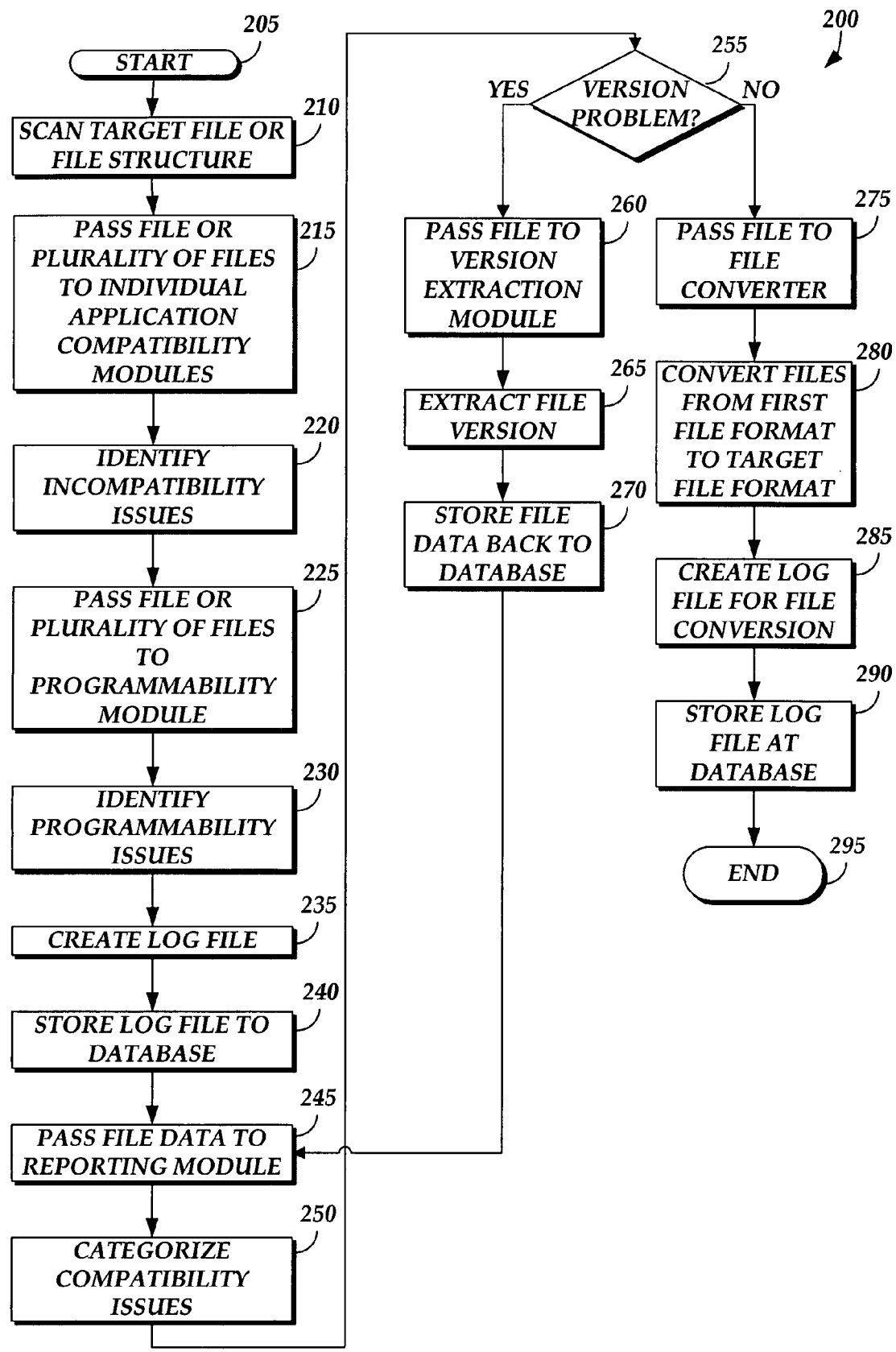
FIG. 2 is a logical flow diagram illustrating a method for scanning, information reporting and automated file conversion of one or more files via an application migration planning manager.

Having described the components comprising the application migration planning manager 100, it is advantageous to further describe embodiments of the present invention with respect to an example operation of the system 100. FIG. 2 is a logical flow diagram illustrating a method for scanning, information reporting and automated file conversion of one or more files via the application migration planning manager. The operational flow 200 begins at start operation 205 and proceeds to operation 210 where the scanner module 105 is directed to scan a target file or file structure. As described above with reference to FIG. 1, a user or administrator operating the system 100 via the reporting module 130 may direct the scanner module 105 to scan a particular file at a target file location or all files stored at a target file storage location.

At operation 215, the control module 110 of the scanner module 105 passes the target file or all files stored at the target storage location to individual application compatibility modules 120, as required, for identifying incompatibility issues and for obtaining data on each of the scanned files. For example, if a target file storage location includes a word processing application file, a spreadsheet application file, and a slide presentation application file, each of the files will be passed to respective application compatibility modules 120 operative to identify incompatibility issues for each file and for obtaining general data on each file including version number, date created, date modified, document author, and the like.

At operation 220, each respective application compatibility module 120 identifies any incompatibility issues as directed by the control module 110. For example, if it is known that a new version of a word processing application has been deployed, then the word processing application compatibility module 120 may check each of the word processing application files passed to it for versions incompatible with the version of the word processing application that has been deployed.

At operation 225, the control module 110 passes the selected file or files to the programmability module 115 for identifying any programmability issues associated with any of the selected files, for example, where any of the selected files include programming code such as Visual Basic for Applications (VBA) coding that may not allow the file to operate on a different or target version of a given software application. At operation 230, any programmability issues for any of the selected files are identified by the programmability module 115.

At operation 235, a log file is created by the control module 110, and the log file is populated with data from the programmability module 115 and from each of the application compatibility modules 120 for each file scanned by the scanner module 105. At operation 240, the log file is stored at the database 125.

At operation 245, the reporting module 130 extracts data from the log file stored at the database 125 for reporting the results of the scanning operation directed to selected files. An operation 250, compatibility issues for any of the scanned files are categorized, as described above. That is, compatibility issues requiring significant corrective action, for example, version extraction, are placed in a first category, files requiring less corrective action are placed in a second category, and files requiring little or no corrective action other than potential file conversion are placed in a third category, as described above. As described above, data on each of the scanned files, including an incompatibility categorization for each file may be displayed in a graphical user interface for review by a user or administrator.

As described above, in some cases, if a given document or file contains multiple edited versions of the document, file conversion may not be accomplished until the multiple edited versions are saved to separate additional files. At operation 255, a determination is made as to whether any of the files are categorized as requiring version extraction or version stripping. If one or more files have been categorized as requiring version correction prior to any desired file conversion, such files are reported in a reporting file 135 to the version extraction module 140 at operation 260.

At operation 265, the version extraction module locates files requiring version extraction via file paths passed to it from the reporting module 130 via the reporting file 135. Next, the version extraction module extracts additional versions of each identified document or data from the files requiring version extraction processing and saves each version as a separate additional file. That is, all of the additional versions except for a single version, for example, the latest version, are stripped from each file having multiple versions so that the starting file may be subsequently processed by the file converter module 145. As should be appreciated, each of the separate additional saved files may likewise be processed by the file converter module 145. At operation 270, the processed files are stored back at their respective file storage locations and data reporting the saving of additional versions from the processed files is passed to the database 125 for subsequent reporting via the reporting module 130.

Referring back to operation 255, if it is desired that one or more files should be converted from a first application version to a second or target application version, the reporting module 130 may be utilized to pass such files to the file converter 145 in the form of a reporting file 135 at operation 275. At operation 280, data representing files to be converted is passed to the file converter module 145, and the control module 150 directs an appropriate conversion module 155 to each respective file via a file path to each file received via the reporting file 135. For example, each word processing application file will be passed to a conversion module for word processing application files, each slide presentation file will be passed to a conversion module 155 for slide presentation application files, and so on.

At operation 280, each respective conversion module 155 converts the files passed to it to a desired target file version. For example, if the files passed to a given conversion module 155 have been created and stored according to a binary format, and a target version of the applicable software application creates and stores applications according to an XML format, then the conversion module 155 may be directed by the control module 150 to convert the word processing application files from the binary format to an XML format for use in the target version of the word processing application file. As should be appreciated, the conversion module may be operative for converting files from a newer file version to an older file version if it is desired that the newer file version files be operated on an older version of the respective software application.

At operation 290, data representing each converted file is written to a log file and is returned to the database 125. As should be appreciated, the converted files are likewise stored in their respective file storage locations for subsequent use according to the desired software application versions.

Operating Environment

Figure 3:
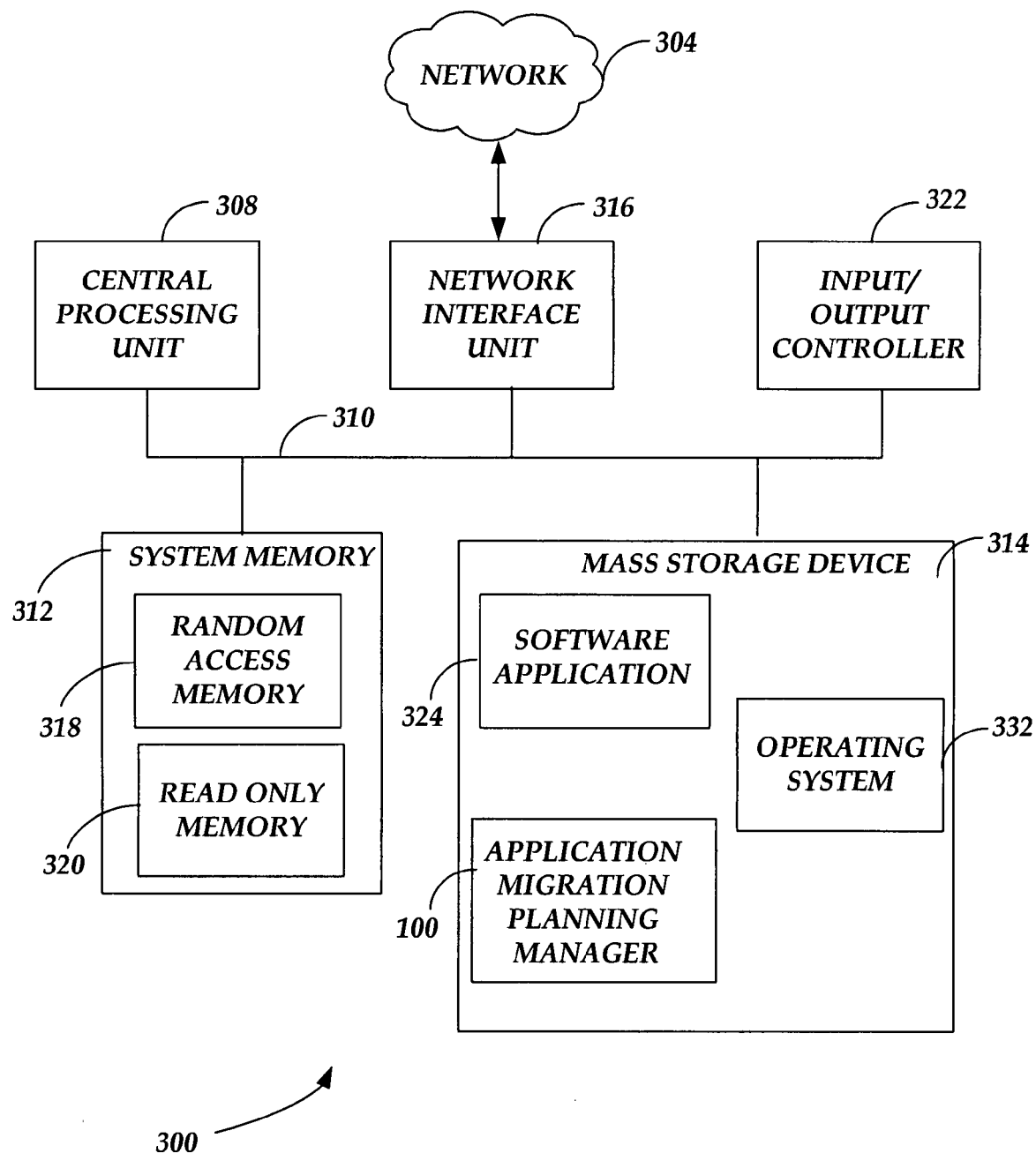
FIG. 3 illustrates a computing operating environment in which embodiments of the present invention may be practiced.

Referring now to FIG. 3, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 3, an illustrative operating environment for embodiments of the invention will be described. As shown in FIG. 3, computer 300 comprises a general purpose desktop, laptop, handheld, mobile or other type of computer (computing device) capable of executing one or more application programs. The computer 300 includes at least one central processing unit 308 ("CPU"), a system memory 312, including a random access memory 318 ("RAM") and a read-only memory ("ROM") 320, and a system bus 310 that couples the memory to the CPU 308. A basic input/output system containing the basic routines that help to transfer information between elements within the computer, such as during startup, is stored in the ROM 320. The computer 302 further includes a mass storage device 314 for storing an operating system 332, application programs, and other program modules.

The mass storage device 314 is connected to the CPU 308 through a mass storage controller (not shown) connected to the bus 310. The mass storage device 314 and its associated computer-readable media provide non-volatile storage for the computer 300. Although the description of computer-readable media contained herein refers to a mass storage device, such as a hard disk or CD-ROM drive, it should be appreciated by those skilled in the art that computer-readable media can be any available media that can be accessed or utilized by the computer 300.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 300.

According to various embodiments of the invention, the computer 300 may operate in a networked environment using logical connections to remote computers through a network 304, such as a local network, the Internet, etc. for example. The computer 302 may connect to the network 304 through a network interface unit 316 connected to the bus 310. It should be appreciated that the network interface unit 316 may also be utilized to connect to other types of networks and remote computing systems. The computer 300 may also include an input/output controller 322 for receiving and processing input from a number of other devices, including a keyboard, mouse, etc. (not shown). Similarly, an input/output controller 322 may provide output to a display screen, a printer, or other type of output device.

As mentioned briefly above, a number of program modules and data files may be stored in the mass storage device 314 and RAM 318 of the computer 300, including an operating system 332 suitable for controlling the operation of a networked personal computer, such as the WINDOWS® operating systems from MICROSOFT CORPORATION of Redmond, Wash. The mass storage device 314 and RAM 318 may also store one or more program modules. In particular, the mass storage device 314 and the RAM 318 may store application programs, such as a software application 324, for example, a word processing application, a spreadsheet application, a slide presentation application, a database application, etc.

According to embodiments of the present invention, an application migration planning manager 100 is illustrated for automated scanning and compatibility information reporting of stored application files, followed by automated conversion of selected files from a first application version format to a second application version format. As should be appreciated, the application migration planning manager 100 may operate as a standalone application that may be used to scan and convert files as described above, or the application migration planning manager 100 may be integrated with a given software application for affecting file scanning and conversion on files associated with the given software application.

It should be appreciated that various embodiments of the present invention may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications may be made thereto within the scope of the claims that follow. Accordingly, it is not intended that the scope of the invention in any way be limited by the above description, but instead be determined entirely by reference to the claims that follow.

We claim:

1. A computer-implemented method of processing an electronic file to make the electronic file compatible with a target software application version, comprising:

scanning the electronic file and obtaining compatibility data representing any compatibility differences between the electronic file and the target software application, the compatibility data including data representing whether the electronic file is formatted according to a software application version that makes the electronic file incompatible with a target software application;

reporting the compatibility data for the electronic file representing any compatibility differences between the electronic file and the target software application;

when the compatibility data for the electronic file includes multiple versions of any data contained in the file;
stripping the electronic file of all versions of the data except for the latest version of the data; and
saving each of the versions of the data, except for the latest version of the data, as separate additional files; and converting the electronic file to a version that is compatible with the target software application, wherein converting the electronic file to a version that is compatible with the target software application comprises converting the electronic file from a newer file version to an older file version when the target software application is compatible with the older file version.

2. The method of claim 1, prior to determining whether the electronic file is formatted according to a software application version that makes the electronic file incompatible with a target software application, scanning the electronic file at a target file storage location.

3. The method of claim 2, wherein scanning the electronic file at a target file storage location includes scanning the electronic file by a scanner control module operative to scan one or more electronic files at specified file storage locations for determining whether any of the one or more electronic files are incompatible with a target software application.

4. The method of claim 1, prior to determining whether the electronic file is formatted according to a software application version that makes the electronic file incompatible with a target software application, passing the electronic file to an application compatibility module operative to determine whether the electronic file is incompatible with a target software application.

5. The method of claim 1, further comprising determining whether the electronic file contains programming that makes it incompatible with a target software application.

6. The method of claim 5, prior to determining whether the electronic file contains programming that makes it incompatible with the target software application, further comprising passing the electronic file to a programmability module operative for determining whether the electronic file contains programming that makes it incompatible with a target software application.

7. The method of claim 1, wherein reporting for the electronic file compatibility data representing any compatibility differences between the electronic file and the target software application includes reporting for the electronic file compatibility data representing any compatibility differences between the electronic file and the target software application via a reporting module.

8. The method of claim 1, prior to converting the electronic file to a version that is compatible with the target software application, passing the electronic file to a file converter module.

9. The method of claim 8, wherein at the file converter module, passing the electronic file to a conversion module that is operative to convert the electronic file to a version that is compatible with the target software application.

10. A computer readable storage medium containing computer executable instructions which when executed by a computer perform a method of processing an electronic file to make the electronic file compatible with a target software application version, comprising:

scanning the electronic file and obtaining compatibility data representing any compatibility differences between the electronic file and the target software application, the compatibility data including data representing whether the electronic file is formatted according to a software application version that makes the electronic file incompatible with a target software application;

reporting the compatibility data for the electronic file representing any compatibility differences between the electronic file and the target software application;

when the compatibility data for the electronic file includes multiple versions of any data contained in the file:
stripping the electronic file of all versions of the data except for the latest version of the data and
saving each of the versions of the data, except for the latest version of the data, as separate additional files; and converting the electronic file to a version that is compatible with the target software application, wherein converting the electronic file to a version that is compatible with the target software application comprises converting the electronic file from a newer file version to an older file version when the target software application is compatible with the older file version.

11. A system for processing an electronic file to make the electronic file compatible with a target software application version, comprising:

a memory for storing executable program code; and a processor, functionally coupled to the memory, the processor being responsive to computer-executable instructions contained in the program code and operative to execute:
- a scanner module operative to scan the electronic file and obtaining compatibility data representing any compatibility differences between the electronic file and the target software application, the compatibility data including data representing whether the electronic file is formatted according to a software application version that makes the electronic file incompatible with a target software application;
- a reporting module operative to report the compatibility data for the electronic file representing any compatibility differences between the electronic file and the target software application;
- a version extraction module operative to:
  - strip the electronic file of all versions of the data except for the latest version of the data when the compatibility data for the electronic file includes multiple versions of any data contained in the file; and
  - save each of the versions of the data, except for the latest version of the data, as separate additional files; and
- a file converter module operative to convert the electronic file to a version that is compatible with the target software application, wherein converting the electronic file to a version that is compatible with the target software application comprises converting the electronic file from a newer file version to an older file version when the target software application is compatible with the older file version.

12. The system of claim 11, the scanner module further comprising:
- a control module operative to direct the electronic file to one or more application compatibility modules for determining any compatibility differences between the electronic file and the target software application;
- the one or more application compatibility modules being operative to generate compatibility data for the electronic file including data representing whether the electronic file is a different application version than the target application version;
- the control module being further operative to pass the compatibility data for the electronic file to a database from which the compatibility data may be extracted by the reporting module.

13. The system of claim 12, wherein the scanner module further comprises a programmability module operative to determine at the direction of the control module whether the electronic file contains programming that makes it incompatible with a target software application.

14. The system of claim 11,
wherein the reporting module is further operative to pass the electronic file to the file converter module.

* * * * *

UNITED STATES PATENT AND TRADEMARK OFFICE
CERTIFICATE OF CORRECTION

| | | |
|---|---|---|
| PATENT NO. | : 7,778,983 B2 | Page 1 of 1 |
| APPLICATION NO. | : 11/714690 | |
| DATED | : August 17, 2010 | |
| INVENTOR(S) | : Michael Philip Jorden et al. | |

It is certified that error appears in the above-identified patent and that said Letters Patent is hereby corrected as shown below:

In column 13, line 44, in Claim 1, delete "file;" and insert -- file: --, therefor.

In column 14, line 52, in Claim 10, delete "data" and insert -- data; --, therefor.

Signed and Sealed this
Eighth Day of February, 2011

David J. Kappos
*Director of the United States Patent and Trademark Office*